United States Patent
Lawson

(10) Patent No.: US 7,662,465 B2
(45) Date of Patent: *Feb. 16, 2010

(54) **WOOD COMPOSITE MATERIAL CONTAINING *PAULOWNIA***

(75) Inventor: Eric N. Lawson, Hull, GA (US)

(73) Assignee: Huber Engineered Woods LLC, Charlotte, NC (US)

(*) Notice: Subject to any disclaimer, the term of this patent is extended or adjusted under 35 U.S.C. 154(b) by 48 days.

This patent is subject to a terminal disclaimer.

(21) Appl. No.: 11/426,535

(22) Filed: Jun. 26, 2006

(65) Prior Publication Data

US 2007/0298199 A1    Dec. 27, 2007

(51) Int. Cl.
*B32B 21/02* (2006.01)

(52) U.S. Cl. .................. 428/218; 428/105; 428/535

(58) Field of Classification Search ............... 428/105, 428/218, 535
See application file for complete search history.

(56) References Cited

U.S. PATENT DOCUMENTS

| PP10,847 P | 4/1999 | Corbett et al. |
|---|---|---|
| 6,569,540 B1 | 5/2003 | Preston et al. |
| 6,737,155 B1 | 5/2004 | Ou |
| 2003/0035921 A1* | 2/2003 | Kornicer et al. ............. 428/107 |
| 2003/0150189 A1 | 8/2003 | Ou et al. |
| 2005/0006003 A1 | 1/2005 | Yokoo et al. |
| 2005/0140038 A1 | 6/2005 | Frienser |
| 2005/0153150 A1* | 7/2005 | Wellwood et al. ......... 428/537.1 |
| 2006/0142428 A1 | 6/2006 | Lawson et al. |

* cited by examiner

*Primary Examiner*—Alexander Thomas
(74) *Attorney, Agent, or Firm*—Gardner Groff Greenwald & Villanueva, PC

(57) ABSTRACT

Disclosed is a wood composite material comprising: upper and lower surface layers and a core layer; wherein the core layer contains at least about 85 wt % *paulownia* strands; and the surface layers contain at least about 85 wt % of other, higher density, non-*paulownia* wood strands.

9 Claims, No Drawings

WOOD COMPOSITE MATERIAL CONTAINING *PAULOWNIA*

BACKGROUND OF THE INVENTION

Wood is a common material used to construct doors and other architectural building elements. Even today, after the development of several new species of composite materials, wood remains one of the most widely-used structural materials because of its excellent strength and stiffness, pleasing aesthetics, good insulation properties and easy workability.

However, in recent years the cost of solid timber wood has increased dramatically as its supply shrinks due to the gradual depletion of old-growth and virgin forests. It is particularly expensive to manufacture doors from such material because typically less than half of harvested timber wood is converted to natural solid wood lumber, the remainder being discarded as scrap.

Accordingly, because of both the cost of high-grade timber wood as well as a heightened emphasis on conserving natural resources, wood-based alternatives to natural solid wood lumber have been developed that make more efficient use of harvested wood and reduce the amount of wood discarded as scrap. Plywood, particle board and oriented strand board ("OSB") are examples of wood-based composite alternatives to natural solid wood lumber that have replaced natural solid wood lumber in many structural applications in the last seventy-five years. These wood-based composites not only use the available supply of timber wood more efficiently, but they can also be formed from lower-grade wood species, and even from wood wastes.

However, while the performance characteristics such as strength and insulation properties of these wood-based composites are comparable or superior to natural solid wood lumber, some users have complained that in certain high-moisture environments, such as exterior siding, the edges of the composite material experience swelling and cracking as water penetrates into the edges of the material and causes it to expand. To prevent this damage various techniques have been developed such as affixing metallic or polymeric moldings to the edges of the wood, or applying a polymer coating or film layer to the susceptible edges of the composite material. These techniques are effective to present edge swelling and cracking, but they have the disadvantage of greatly increasing the materials' cost and the complexity of the manufacturing process used to prepare it.

Given the foregoing, there is a continuing need for a wood composite material that can address these inadequacies. Notably this wood composite material would have superior or comparable performance to solid wood lumber while being lighter (lower density) than conventional OSB materials, have a better surface finish that would possibly, eliminate the need for a post-pressing sanding step, and have excellent resistance to edge-swelling and other such moisture-related defects. Additionally, this wood composite material would incorporate to some extent fibers harvested from tree species that are faster growing than those species which are conventionally used for wood composite materials.

BRIEF SUMMARY OF THE INVENTION

The present invention relates to a wood composite material comprising: upper and lower surface layers and a core layer; wherein the core layer contains at least about 85 wt % *paulownia* strands; and the surface layers contain at least about 85 wt % of other, higher density, non-*paulownia* wood strands.

DETAILED DESCRIPTION OF THE INVENTION

All parts, percentages and ratios used herein are expressed by weight unless otherwise specified. All documents cited herein are incorporated by reference.

As used herein, "wood" is intended to mean a cellular structure, having cell walls composed of cellulose and hemicellulose fibers bonded together by lignin polymer. It should further be noted that the term "wood" encompasses lignocellulosic material generally.

By "wood composite material" it is meant a composite material that comprises wood and one or more wood composite additives, such as adhesives or waxes. The wood is typically in the form of veneers, flakes, strands, wafers, particles, and chips. Non-limiting examples of wood composite materials include oriented strand board ("OSB"), waferboard, particle board, chipboard, medium-density fiberboard, plywood, parallel strand lumber, oriented strand lumber, and laminated strand lumbers. Common characteristic of the wood composite materials are that they are composite materials comprised of strands and ply veneers binded with polymeric resin and other special additives. As used herein, "flakes", "strands", "chips", "particles", and "wafers" are considered equivalent to one another and are used interchangeably. A non-exclusive description of wood composite materials may be found in the Supplement Volume to the Kirk-Othmer Encyclopedia of Chemical Technology, pp 765-810, $6^{th}$ Edition.

The present invention is directed to wood composite material (especially wood composite boards and panels) comprising *paulownia* strands. *Paulownia* as a material has many advantages over other wood materials typically used in wood composite boards. Most notably *paulownia* grows faster than other similar wood species. Additionally, *paulownia* has been shown to suffer less from high moisture environments. Furthermore *paulownia* has an excellent strength to weight ratio: being much less dense than other wood species. One drawback of fast-growing wood species, such as *paulownia*, is that those species tend to yield lower density wood and have a high fraction of juvenile wood. Within a given species, juvenile wood is less desirable than mature wood for use in wood composites because of the low strength of juvenile wood. Since density is correlated to stiffness and strength, low density species, such as *Paulownia*, tend to be of lower value for use in wood composites. For example, *paulownia* lumber of a particular size is not as strong as other wood materials of the same dimensions, therefore superior or comparable strength performance must be obtained by cutting *paulownia* into thicker pieces or using it in combination with other wood materials.

The *Paulownia* tree, including species such as *Paulownia tomentosa* and *Paulownia elongata, Paulownia kawakamii, Paulownia fortunei, Paulownia fargesii, Paulownia catalpifolia, Paulownia albiphloea, Paulownia australis,* and *Paulownia taiwaniana*, is a genus of tree native to mainland China. It has been used for centuries, especially by the Japanese, for decorative purposes as well as in certain structural applications. It is an attractive tree with long, foxglove-like flowers borne in the spring, and large flexible leaves. It typically grows in disturbed areas with little competition and can be found throughout most of the United States, in mined land, abandoned lots, road cuts, as well as silvicultural plantations. In fact, *paulownia*'s rapid growth profile means that *paulownia* trees grown in a plantation setting have been shown to reach harvestable size for wood composite materials in as little as two to three years.

The boards or panels prepared according to the present invention may be made in the form of a variety of different materials, such as wood or wood composite materials, such as oriented strand board ("OSB"). In addition to *paulownia*, these OSB panels also incorporate strands from other suitable wood species materials including naturally occurring hard or soft woods species, singularly or mixed, whether such wood is dry (having a moisture content of between 2 wt % and 12 wt %) or green (having a moisture content of between 30 wt % and 200 wt %). Suitable wood species in addition to *paulownia* include pine species such as Loblolly pine, Virginia Pine, slash pine, Short leaf pine, and long leaf pines, as well as Aspen or other hardwood species similar to Aspen wood.

In the present invention, the *paulownia* strands are concentrated in the core layers and the other wood species strands are concentrated in the surface layers. Preferably, the surface layers contain less than 15 wt % *paulownia*, and greater than about 85 wt % of strands of the other, non-*paulownia*, wood species. Preferably, the core layers contain less than 15 wt % other wood species and greater than about 85 wt % of strands of *paulownia*.

One particular consequence regarding the increased concentration of *paulownia* strands in a wood composite is that the wood composite material will be less dense. For example, OSB boards meeting PS-2 standards and which do not contain any *paulownia* strands have a density in the range of about 35 lbs/ft$^3$ to about 48 lbs/ft$^3$. The density ranges from 40 lbs/ft$^3$ to 48 lbs/ft$^3$ for southern pine, and 35 lbs lbs/ft$^3$ to 42 lbs/ft$^3$ for Aspen. By contrast, OSB boards made wholly of *paulownia* strands and manufactured to meet PS-2 criteria will have a density in the range of about 20 lbs/ft$^3$ to about 40 lbs/ft$^3$). For other applications where it is not necessary to meet the PS-2 standards useful wood composites could be manufactured with densities as low as 15 lbs/ft$^3$, and in these other applications, mixing Paulownia with other wood species may be desirable. Of course, the higher the fraction of *paulownia* strands used in these mixed wood species composites the lower the density of the board or panel. The panel should have a thickness of about 0.6 cm (about ¼") to about 10.2 cm (about 4").

Typically, the raw wood starting materials, either virgin or reclaimed, are cut into strands, wafers or flakes of desired size and shape, which are well known to one of ordinary skill in the art. The strands are preferably more than 2 inches long, more than 0.3 inch wide, and less than 0.25 inch thick. While not intended to be limited by theory, it is believed that longer strands, i.e., longer than about 6 inches, improves the final product mechanical strength by permitting better alignment. It is also known that uniform-width strands are preferred for better product quality. Uniform strand geometry allows a manufacturer to optimize the manufacturer's process for each size of strand. For instance, if all the stands were 4 inches×1 inch, then the orienter could be optimized to align those strands within a single layer. If strands that were 1 inch long and 0.25 inch wide were added, some of those could slide thru the orienters sideways. Cross-oriented strands lower the overall mechanical strength/stiffness of the product.

After the strands are cut they are dried in an oven to a moisture content of about 1 to 20%, preferably between 2 to 18%, more preferably from 3 to about 15%, and then coated with one or more polymeric thermosetting binder resins, waxes and other additives. The binder resin and the other various additives that are applied to the wood materials are referred to herein as a coating, even though the binder and additives may be in the form of small particles, such as atomized particles or solid particles, which do not form a continuous coating upon the wood material. Conventionally, the binder, wax and any other additives are applied to the wood materials by one or more spraying, blending or mixing techniques, a preferred technique is to spray the wax, resin and other additives upon the wood strands as the strands are tumbled in a drum blender.

After being coated and treated with the desired coating and treatment chemicals, these coated strands are used to form a multi-layered mat. In a conventional process for forming a multi-layered mat, the coated wood materials are spread on a conveyor belt in a series of two or more, preferably three layers. Preferably, the strands are positioned on the conveyor belt as alternating layers where the "strands" in adjacent layers are oriented generally perpendicular to each other, but it is also understood by those skilled in the art that the products made from this process could have the strands aligned all in the same direction or randomly without a particular alignment.

Various polymeric resins, preferably thermosetting resins, may be employed as binders for the wood flakes or strands. Suitable polymeric binders include isocyanate resin, urea-formaldehyde, phenol formaldehyde, melamine formaldehyde ("MUF") and the co-polymers thereof. Isocyanates are the preferred binders, and preferably the isocyanates are selected from the diphenylmethane-p,p'-diisocyanate group of polymers, which have NCO— functional groups that can react with other organic groups to form polymer groups such as polyurea, —NCON—, and polyurethane, —NCOO—. 4,4-diphenyl-methane diisocyanate ("MDI") is preferred. A suitable commercial pMDI product is Rubinate 1840 available from Huntsman, Salt Lake City, Utah, and Mondur 541 pMDI available from Bayer Corporation, North America, of Pittsburgh, Pa. Suitable commercial MUF binders are the LS 2358 and LS 2250 products from the Dynea corporation.

The binder concentration is preferably in the range of about 1.5 wt % to about 20 wt %, more preferably about 2 wt % to about 10 wt %. A wax additive is commonly employed to enhance the resistance of the OSB panels to moisture penetration. Preferred waxes are slack wax or an emulsion wax. The wax loading level is preferably in the range of about 0.5 wt % to about 2.5 wt %.

After the multi-layered mats are formed according to the process discussed above, they are compressed under a hot press machine that fuses and binds together the wood materials to form consolidated OSB panels of various thickness and sizes. Preferably, the panels of the invention are pressed for 2-10 minutes at a temperature of about 100° C. to about 260° C.

The invention will now be described in more detail with respect to the following, specific, non-limiting examples.

EXAMPLES

Wood composite boards were prepared according to the present invention to demonstrate the superior wood performance characteristics of wood boards prepared with a concentration of *paulownia* strands in the core layer.

Pine logs and *paulownia* logs were obtained for use. The logs were then cut into strands of between 1 to 6 inches in length, 0.25 to 4 inches wide and about 0.025 inch thick The strands were then dried (for the *paulownia*) overnight in a Gruenberg forced air oven in the laboratory at 103° C. or (for the pine) in a conventional full manufacturing scale dryer. These strands were then sorted and pressed into twelve different types of panels, each with different combinations of strands and final panel density were made as follows:

TABLE I

| # | Material | Density (pcf) | Paulownia/pine Concentration (%) |
|---|----------|---------------|----------------------------------|
| 1 | Paulownia surface, Pine core | 40 | 70/30 |
| 2 | Paulownia surface, Pine core | 40 | 30/70 |
| 3 | Paulownia surface, Pine core | 34 | 70/30 |
| 4 | Paulownia surface, Pine core | 34 | 30/70 |
| 5 | Pine surface, Paulownia core | 40 | 70/30 |
| 6 | Pine surface, Paulownia core | 40 | 30/70 |
| 7 | Pine surface, Paulownia core | 34 | 70/30 |
| 8 | Pine surface, Paulownia core | 34 | 30/70 |
| 9 | Throughout | 40 | 70/30 |
| 10 | Throughout | 40 | 30/70 |
| 11 | Throughout | 34 | 70/30 |
| 12 | Throughout | 34 | 30/70 |

(Panels No. 5-8 represent panels prepared according to the present invention). The strands were oriented in a single direction only (i.e., the core was oriented in the same direction as the surfaces). The panels in the above examples contained 5 wt % of Mondur G541 pMDI available from the Bayer Corporation, Pittsburgh, Pa. (No wax was used in the experiment.)

The panels were then cut into smaller sizes and tested for several different wood composite performance characteristics according to the protocol specified in ASTM D1037. These performance characteristics included Modulus of Elasticity ("MOE", a measure of panel stiffness) in both the parallel and the perpendicular directions; Modulus of Rupture ("MOR", a measure of panel strength) in both the parallel and the perpendicular directions; 24 hour water soak water absorption; 1 inch thickness swell, and edge swell. The performance characteristics measured for both the prior art panels and the panels of the present invention are set forth in table II, below.

TABLE II

| Characteristic | Paulownia Core/Pine Surface (present Invention) | Mixed Paulownia and Pine Strands | Paulownia Surface/ Pine Core |
|---|---|---|---|
| MOE | 1,000,000 | 925,000 | 980,000 |
| MOR | 73 | 65 | 69 |
| Water Absorption (24 hr, % thickness increase) | 24.5% | 29% | 31.50% |
| 1 inch in thickness swell (24 hr water soak, % thickness increase) | 18.5% | 19.5% | 23% |
| Edge swell (24 hr water soak, % thickness increase) | 20% | 20.5% | 23.5% |

As can be seen in Table I, the OSB board prepared according to the present invention had significantly better performance characteristics than the other boards. Notably the OSB board according to the present invention had much better thickness, edge swell and water absorption performance than the comparative boards, demonstrating that it is much better for use in higher moisture environments. As for strength properties, the board prepared according to the present invention had superior performance in all characteristics when set next to the comparative boards.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A wood composite material comprising:
   upper and lower surface layers and a core layer between the upper and lower surface layers, wherein the core layer comprises at least about 85 wt % paulownia strands bound together with an isocyanate binder resin, wherein the surface layers comprise at least about 85 wt % of other, higher density, non-paulownia wood strands bound together with an isocyanate binder resin, and wherein the paulownia strands and non-paulownia strands generally all have lengths of one to six inches, widths of at least about 0.3 inches, and thicknesses no more than about 0.25 inches.

2. The wood composite material according to claim 1, wherein the wood composite board has a density of about 20 lbs/ft$^3$ to about 50 lbs/ft$^3$.

3. The wood composite material according to claim 1, wherein the other, non-paulownia wood strands are selected from the group consisting of pine species, aspen species, and other hardwood and softwood species.

4. The wood composite material according to claim 1, wherein the wood composite material is in the form of an oriented strand board.

5. The wood composite material according to claim 1, wherein the wood composite material comprises from about 1 wt % to about 20 wt % of the isocyanate binder resin.

6. A wood composite material comprising:
   upper and lower surface layers and a core layer, wherein the core layer comprises at least about 85 wt % paulownia strands, wherein the surface layers comprise at least about 85 wt % of wood strands selected from the group consisting of pine species and aspen species.

7. The wood composite material according to claim 6, wherein the wood composite board has a density of about 20 lbs/ft$^3$ to about 50 lbs/ft$^3$.

8. The wood composite material according to claim 6, wherein the wood composite board is in the form of an oriented strand board.

9. The wood composite material according to claim 6, wherein the wood composite comprises from about 1 wt % to about 20 wt % of polymeric binders.

* * * * *